May 5, 1953     W. G. HOELSCHER     2,637,412
LUBRICATING APPARATUS Filed Sept. 8, 1948     5 Sheets-Sheet 1

INVENTOR.
William G. Hoelscher
BY
Wood, Arey, Herron & Evans
ATTORNEYS.

May 5, 1953 W. G. HOELSCHER 2,637,412
LUBRICATING APPARATUS
Filed Sept. 8, 1948 5 Sheets-Sheet 2

INVENTOR.
William G. Hoelscher
BY
Wood, Arey, Herron & Evans
ATTORNEYS

Patented May 5, 1953

2,637,412

UNITED STATES PATENT OFFICE 2,637,412

LUBRICATING APPARATUS

William G. Hoelscher, Cincinnati, Ohio, assignor to The American Tool Works Company, Cincinnati, Ohio, a corporation of Ohio Application September 8, 1948, Serial No. 48,247

9 Claims. (Cl. 184—6)

This invention relates to the lubrication of machine tools, particularly with reference to the bed ways, tool slides, apron gearing and other components of a lathe carriage. More specifically, the invention resides in a lubricant pump unit which provides automatic lubrication of these parts during carriage traverse and which includes an auxiliary pump which may be actuated manually to supplement the automatic lubricant supply.

In setting up a lathe for operation, it is necessary preliminarily to translate the carriage to a working position so as properly to locate the cutting tool longitudinally with respect to the work. It is of course customary to provide lubrication between the lathe bed and carriage to reduce friction and wear incident to traverse of the carriage. However, after the machine has been shut down for a period of time, the film of oil between the bed and carriage tends to dissipate so that the carriage binds relative to the ways and excessive force is required to overcome initial resistance to movement. This, of course, overloads the driving apparatus, causing excessive wear of the parts and reducing the life and efficiency of the machine. The binding effect increases with the duration of the inactive period so that the problem becomes serious when the machine has been idle for several days. It will be apparent that automatic lubricating equipment, which feeds lubricant to the parts during operation of the machine, will be ineffective to correct this condition since the automatic operation does not commence until after the machine is placed in operation.

It has therefore been a primary object of the present invention to provide an automatic lubrication system to apply a film of lubricant between the carriage and ways, the tool slide and the running gear of the carriage, and to supplement the automatic equipment by means of a manually operated pump so that the parts may be lubricated manually before starting the machine to avoid hard starting and excessive wear due to the lack of lubrication.

By reason of the diverse lubrication requirements of the bed ways and apron running gear, it has been the practice to provide a positive displacement pump having dual displacement chambers which differentiate between the volume of lubricant supplied to the ways and to the apron, according to the requirements of each. A manually operated pump of this character is disclosed in the co-pending application of William G. Hoelscher, Serial No. 539,208, filed on June 7, 1944, to which attention is invited. This application is now Patent No. 2,505,737, issued on April 25, 1950. This apparatus includes a single pump plunger having two diameters operating in respective displacement chambers. One of the plungers provides a relatively small volumetric displacement and directs lubricant to the apron running gear, while the other delivers a greater volume to the carriage for lubrication of the ways. A separate distribution system extends from the respective displacement chambers to deliver oil to the required points. The dual displacement pump plunger is operated by a manual lever accessible at the front of the apron so that the lubricant is supplied at the discretion of the operator.

The present improved structure is based upon the general concept of supplying a measured volume of lubricant by positive displacement, individually to the carriage and running gear by the use of a dual displacement automatic pump, combined with a dual displacement auxiliary or manually operated pump. The arrangement is such that the operator need only actuate the manual lever when first starting the machine, after which the automatic apparatus goes into operation. In the present instance, each pump discharges in common into a pair of arteries leading to the apron and carriage respectively and these communicate with the distribution system in a manner generally following that disclosed in the above noted co-pending application.

It has been another object of the invention to provide a combined automatic and hand operated dual delivery lubricant pump unit, with the delivery passageways so arranged that the greater volume of lubricant is supplied to the carriage and ways when the manual pump section is actuated to eliminate completely the binding effect after an idle period and to provide a lesser discharge to the carriage and ways during automatic operation, correlated to the needs of the machine, thus to prevent flooding and undesirable dripping of oil from the bed.

In the present apparatus the delivery passageways from the manually operated auxiliary pump interconnect with the delivery passageways of the automatic pump in reverse order to the two main supply arteries leading to the carriage and apron gearing. Thus, the manual pump will supply the required high volume to the carriage and low volume to the apron preliminarily to starting the machine while the automatic pump supplies the low volume to the carriage continuously during machine operation and high volume to the apron. The apron includes a reservoir or sump for the lubricant supply, therefore, the high volume discharge to the apron during machine operation, to flood the driving gears and bearings simply drains back to a reservoir. The low volume discharge to the carriage is adequate but is not sufficient to cause flooding and dripping from the lathe bed.

Another object of the invention has been to provide a combined automatic and auxiliary lubricant pump constructed as a compact simplified unit which may conveniently be removed from the front of the apron for inspection or servicing and which projects directly into an oil reservoir formed in the apron so that the oil is received into both pumps directly from the reservoir.

A further object has been to provide a pump assembly of this nature having passageways formed directly in the pump casings so that the respective displacement chambers of each pump unit interconnect with the displacement chambers of the other, such that a single pair of delivery arteries supplies oil in common from either pump to the point of discharge thus simplifying the lubricant distribution system.

Still another object of the invention has been to provide an automatic delivery pump which is interconnected with the feed gearing of the apron in such manner that the automatic pump operates whether the carriage is translated by hand, by means of the feed rod and gears, or by means of the feed screw. In its delivery stroke the automatic pump is spring powered so that it may stall and avoid damage should the system become clogged or otherwise inoperative. The manual pump is spring driven on its return stroke to give the operator positive control over the delivery of oil.

A still further object has been to provide a distribution system in connection with the automatic and manually operated pumps which include check valves placed at strategic points to prevent drainage of lubricant from the system, to keep the distribution system charged at all times and to prevent trapping of air in the system so that a positive lubricant displacement to the bearing surfaces occurs immediately upon operation of either pump.

Further objects and salient features of the invention will be disclosed in the detailed description with reference to the accompanying drawings disclosing a preferred embodiment of the invention, so that those skilled in the art will comprehend the various modifications to which the invention is susceptible.

In the drawings:

Figure 3 is a fragmentary sectional view taken on line 3—3, Figure 1, illustrating the bed ways, with the carriage saddle mounted thereon, and the tool slide mounted relative to the saddle, together with the various lubricant ducts to illustrate generally the manner in which the lubricant is distributed to these parts.

General description of the carriage structure

Figure 1:
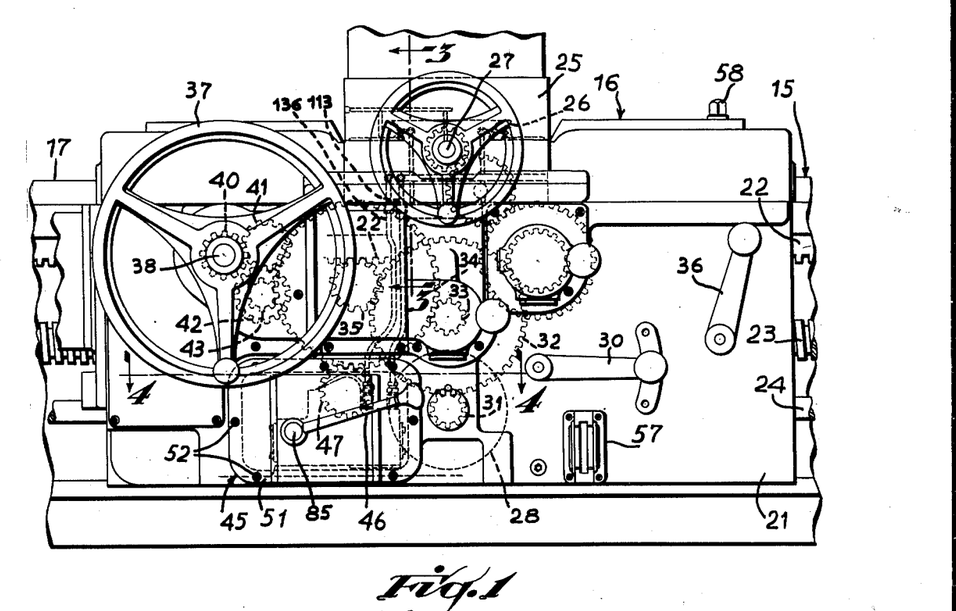
Figure 1 is a fragmentary side elevation of a lathe bed with the carriage mounted thereon, illustrating the general arrangement of the carriage, the location of the lubricant pump, and the gear train for driving the automatic pump when the carriage is translated.

Referring to Figure 1, which illustrates the general arrangement and organization of the carriage and lubricating apparatus, the bed of the lathe is indicated generally at 15 and the lathe carriage, generally at 16. The lathe bed is of the usual construction having sets of ways 17 and 18 (Figure 3) in parallel relationship along the opposite longitudinal sides of the bed. For purposes of illustration, the forward side of the lathe bed is illustrated in Figure 3, but it will be understood that the rearward side of the bed is substantially of the same construction.

In general, the lathe carriage constitutes a saddle 20 and an apron 21, which is secured to and depends downwardly from the saddle at the forward side of the lathe. The apron serves as a housing for the driving gears by means of which the carriage is translated longitudinally and is provided with the usual operating levers to control longitudinal carriage feed and transverse tool slide translation. Following the general practice, the lathe bed includes a rack 22, a feed screw 23 and a feed rod 24 by means of which power is transmitted to the apron for power translation.

Referring to Figures 1 and 3, a tool slide 25 is slidably mounted upon ways 26 formed in the upper surface of the saddle. A tool slide feed screw 27 extends crosswise relative to the saddle and interconnects with the tool slide in the usual manner (not shown) to permit the tool slide to be fed at right angles to and from the work either by power or by a hand wheel mounted at the front of the apron. The lubricant apparatus and supply system is designed to supply lubricant to the bearing surfaces of the bed ways 17 and 18 and to the cross slide ways 26 in a manner more clearly described hereinafter.

Figure 2:
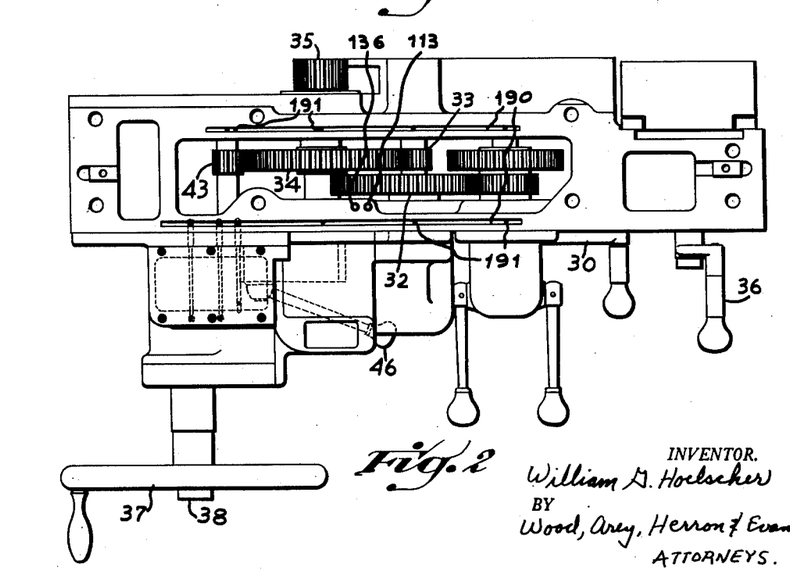
Figure 2 is a top plan view projected from Figure 1 of the carriage apron with the saddle removed so as more clearly to illustrate the arrangement of the lubricant channels, gear train and other components of the apron.

As shown in Figures 1 and 2, the apron 21 includes a gear train by means of which the carriage is translated and which operates concurrently, the automatic, power driven, lubricant pump. Following standard practice, the apron includes a pair of bevel gears (not shown) which are slidably keyed to the feed rod 24 and which mesh with a large bevel gear 28. A control lever 30, journalled at the front of the apron, operates a clutch which alternately establishes a driving connection from the feed rod to either one of the small bevel gears which mesh on opposite sides of the large bevel gear 28. Thus, when the lever is moved in either direction from the centralized position shown, the large bevel gear is driven in the selected direction to cause translation of the carriage assembly. The large bevel gear includes a pinion 31 which meshes with a large gear 32, and the large gear 32 includes a pinion 33. The pinion 33 meshes with a large gear 34 which includes a pinion 35 which meshes with the rack 22. Thus, the rotation of feed rod 24 may be transmitted through the gear train to the pinion 35 which in turn translates the carriage assembly by reason of its engagement with the teeth of rack 22.

For certain classes of work, the carriage is translated by means of the feed screw 23. For this purpose, the apron includes a split nut (not shown) engageable with the screw 23. The split nut is operated by a hand lever 36 which engages or disengages the split nut with the thread of feed screw 23 to translate the carriage.

The apron also is provided with a hand wheel 37 to permit hand traverse of the carriage. For this purpose, shaft 38, upon which the hand wheel is keyed, includes a pinion 40 meshing with a gear 41. The gear 41 meshes with a gear 42 which includes a pinion 43. Pinion 43 meshes with the large gear 34 so that rotation of the hand wheel drives pinion 35 to translate the carriage. The running gear shafts and bearings above described, are supplied with lubricant from the lubricating apparatus, either when the lubricating apparatus is operated manually or by means of the automatic power driven lubricating supply pump. Appropriate conduits and passageways, hereinafter described, distribute the oil to these various parts.

*General arrangement of lubricating equipment*

The combined hand and power operated lubricating supply unit is mounted at the lower portion of the apron as indicated generally at 45 in Figure 1. A manual operating lever 46 extends from the unit 45 to provide manual lubrication of the running gear and slide bearings of the saddle and tool slide. This lever is intended primarily for use in preliminarily lubricating the entire assembly after the machine has been shut down for a somewhat extended period although it may be operated at any time at the discretion of the operator to supply additional lubrication. The automatic power driven section of the pump operates independently of the manually operated section whenever the carriage is translated.

The power operated pump assembly is driven by means of the pinion 47 (Figure 1) which meshes with the large gear 34. As previously noted, when the carriage is translated by power from the feed rod 24, by operation of lever 30, the gear train between the feed rod and gear 34 drives rack pinion 35, and since gear 34 meshes with pump pinion 47, the pump operates automatically during carriage translation. In a similar manner, when hand wheel 37 is rotated for manual translation of the carriage, the gear train of the hand wheel drives large gear 34 and rack pinion 35 and pump pinion 47, thus operating the automatic lubrication pump during this operation. When the lever 36 is placed in operating position to cause carriage translation by the feed screw 23, movement of the carriage is transmitted to pinion 35 by virtue of its connection with the rack 22. Rotation of pinion 35, of course, drives the large gear 34 which meshes with pump pinion 47 so that the pump automatically is operated during translation of the carriage by the feed screw. It will be apparent, therefore, that automatic lubrication of the slide ways and of the running gear of the apron occurs whenever the carriage is translated whether by power or whether by hand operation.

Figure 6:
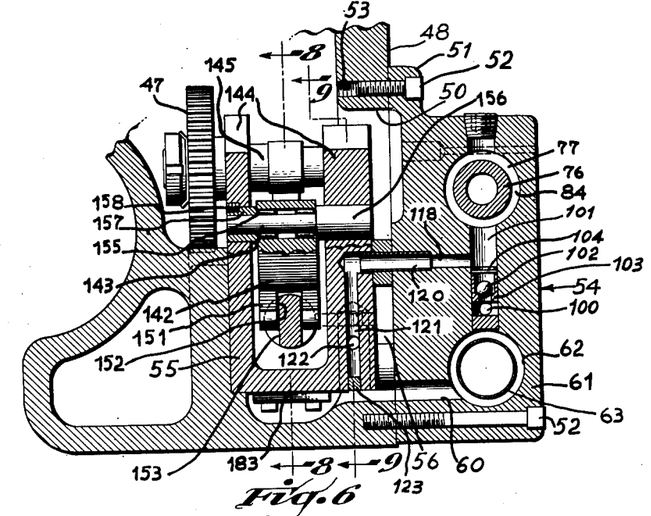
Figure 6 is a sectional view taken on line 6—6, Figure 5, illustrating the auxiliary and automatic power driven pump assemblies and their relationship with each other.

As shown in Figure 6, the hand and power pump sections are joined together to form a single unit. The forward wall 48 of the apron includes an opening 50, and the hand pump section includes a flange 51 surrounding the opening. The flange is drilled to receive a series of socket head screws 52 which are screwthreaded into holes 53 tapped in the wall 48. The hand pump section is indicated generally at 54 and is disposed to the exterior of the apron, while the power pump section 55 is secured to the hand pump casing and is disposed to the interior of the apron.

The present invention resides primarily in the structure and arrangement of these pumps, and for this reason, the structural details of the apron structure have been omitted from the disclosure. In order to maintain an oil supply for the pumps, the lower portion of the apron constitutes an oil reservoir or well indicated at 56. This reservoir preferably extends for the full length of the or oil level gauge 57 may be provided at the front or level gauge 57 may be provided at the front of the apron. A filler plug 58 is screwthreaded through the saddle to permit oil periodically to be supplied to the reservoir 56.

Figure 5:
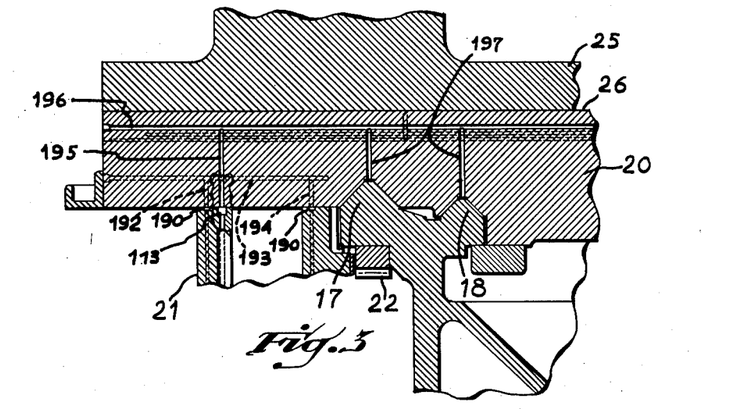
Figure 5 is a sectional view taken on line 5—5, Figure 4, detailing the hand or auxiliary pump assembly.

As shown in Figures 5 and 6, a series of oil intake passageways 60 extend from the casing 61 of the auxiliary pump to the lower portion of the oil reservoir 56. The casing 61 includes an enlarged longitudinal bore 62 in which is mounted an oil filter cartridge 63. This cartridge may be of any available commercial form and is so arranged that oil passing from the reservoir must pass through the filter before reaching the pumps. The filter is utilized in order to remove solids from the oil since the oil supplied to the apron running gear drains back to the reservoir or sump to be recirculated by the pumps. As shown in Figure 5, the inner end of the filter 63 is mounted in a sleeve 64, the opposite end of the filter being closed. Therefore, the oil from the reservoir passes through passageway 60, fills the bore 62 around the outside diameter of the filter, and passes through the filter to the inside diameter 65 of sleeve 64 as it is drawn into the pumps, both of which are supplied through this filter. An annular groove 66 is formed in the outside diameter of sleeve 64 and radial openings 67—67 are drilled through the sleeve to permit the passage of oil through the sleeve to the annular groove 66.

It will be noted that the housing 61 of the auxiliary pump includes end closure plates 68—68 at opposite ends. These plates close off the bore 62 and maintain the sleeve 64 in position in bore 62, the sleeve 64 for this purpose including a shoulder 70 and the bore 62 having a counterturned end to receive this shoulder. Gaskets 71— 71 are disposed between the end plates and pump housing to provide an oil tight seal. The respective end plates are secured in position by means of a series of socket head screws 72. By removing the right hand plate as viewed in Figure 5, the filter unit 60 may be removed from the assembly for replacement. As previously noted, a separate distribution system is provided respectively for the running gear of the apron and for the sliding surface of the carriage which bears upon the tool slide. These systems are interconnected both with the auxiliary hand pump and with the automatic pump so that operation of either pump supplies lubricant to both systems.

In order to provide lubricant supply from each individual pump to both distribution systems, the lubricant passes from the auxiliary pump through the automatic pump when the auxiliary pump is actuated, and passes directly from the automatic pump to both supply systems when the automatic pump is operating. It is to be noted at this point that the respective pumps each are of the positive displacement plunger type so that a predetermined discharge of lubricant occurs at each stroke. Additionally, each pump is of the dual displacement type for which purpose each includes a single plunger having a low volume, high pressure piston, and a high volume, low pressure piston. The pumps are arranged in such manner that manual operation of the auxiliary pump causes high volume, low pressure oil displacement to the carriage, and low volume, high pressure oil displacement to the apron running gear, and conversely the automatic pump provides low volume, high pressure delivery to the carriage and high volume, low pressure delivery to the apron running gear. The apparatus is arranged in this manner because a relatively large volume of lubricant is required adequately to supply the lathe bed and tool slide, while a relatively small volume of oil is sufficient to lubricate the apron running gear prior to starting the machine. On the other hand, during carriage traverse, a lesser volume is supplied to the ways and tool slide and a larger volume is supplied to the apron running gear. In setting up for operation, it is recommended that the auxiliary pump lever be operated for several strokes to place a sufficient amount of oil on the bed ways until the automatic supply goes into effect. Thus, a relatively large volume of oil, sufficient to provide a film between the saddle and bed ways, is placed between the bearing surfaces before translation of the carriage to avoid excessive wear and to provide easy starting of the machine. It will be apparent that during automatic operation, a lesser supply is required for the bed ways since the lubricant will accumulate by reason of the continuous operation of the automatic pump during carriage translation. It has been determined for a given size of machine that the auxiliary pump should displace approximately .77 cu. in. of oil per stroke to the apron, and approximately 1.7 cu. in. per stroke to the carriage. On the other hand, in view of the continuous operation of the automatic pump and the fact that the apron lubricant drains back to the reservoir, a displacement of approximately .020 cu. in. per stroke has been found adequate for the carriage, while the pump supplies .126 cu. in. per stroke to the apron running gear. It will be apparent, however, that the discharge may be varied according to the quantity of lubricant, machine size and design, and other factors.

Auxiliary pump construction

As shown in Figure 5, the upper portion of the pump casing 54 includes a bore 73 in which is slidably sustained a dual displacement pump plunger indicated generally at 74. The right hand end of plunger 74 includes a high volume discharge piston 75 which is effective for its full diameter for discharging the oil from displacement cylinder 73. The intermediate portion of the pump plunger 76 is somewhat smaller in diameter and is slidably fitted in a bushing 77 which is secured by means of a screw 78 in bore 73. The left hand end of the plunger includes a head or piston 79 of substantially the same diameter as piston 75. Each piston includes a series of oil grooves 80 to provide an oil seal. The piston 79 is secured by means of a nut 81 screwthreaded upon a shank 82 to permit the bushing 77 to be slipped on the intermediate plunger section 76 prior to assembly of the plunger unit in its bore 73. The bore section between the sleeve 77 and head 79 constitutes the high pressure, low volume displacement chamber 84.

Figure 4:
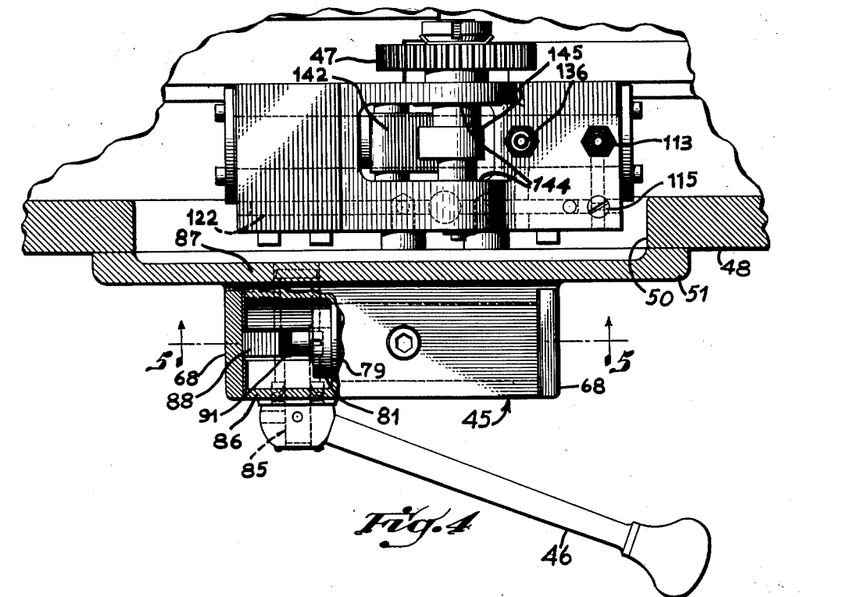
Figure 4 is a fragmentary sectional view taken on line 4—4, Figure 1, illustrating the mounting of the lubricant pump assemblies with respect to the apron.

As shown in Figures 4 and 5, plunger 75 is actuated by means of the auxiliary lubricant supply lever 46 which is pinned to shaft 85. The shaft 85 is suitably journalled in the opposite side walls 86 and 87 of pump housing 54. An actuating lever 88 (Figure 5) is keyed to shaft 85 as at 90 and the free end of the lever contacts the abutment end 91 of plunger 75. Disposed within a bore formed in plunger 74 is a compression spring 92 bearing against the plunger and having its opposite end seated against the end plate 68 to maintain the plunger under spring compression against the end of lever 88. Thus, when the manual lever 46 is moved downwardly, the pump plunger is forced to the right as viewed in Figure 5. Downward movement of the hand lever provides the delivery stroke, the spring 92 serving to return the plunger and lever to the starting point.

As the plunger 74 moves toward the left during its return stroke, lubricant passes from the inside diameter 65 of bushing 64, through the radial opening 67, annular groove 66, to a vertical passageway 93 having a ball check valve 94 maintained in a cage or thimble 95 which is screwthreaded into bore 93. A cross pin 96 prevents upward displacement of the ball. Passageway 93 is drilled through from bottom of housing 54 prior to installation of the filter unit and the open end of the passageway is blocked off by a plug 97 screwthreaded into the bore. As the lubricant is drawn past the ball check valve, it passes into a lateral passageway 98; thence upwardly into the displacement chamber 73.

A branch passageway 100 (Figure 5) extends from passageway 93 to a vertical passageway 101 opening into the low volume, high pressure displacement chamber. A ball check valve 102 maintained in a cage 103 is secured in passageway 101 by means of cross pin 104. During the return stroke of the plunger 75 therefore, the lubricant flows upwardly through ball check valves 94 and 102 to the high and low volume displacement chambers 73 and 84 respectively.

Figure 7:
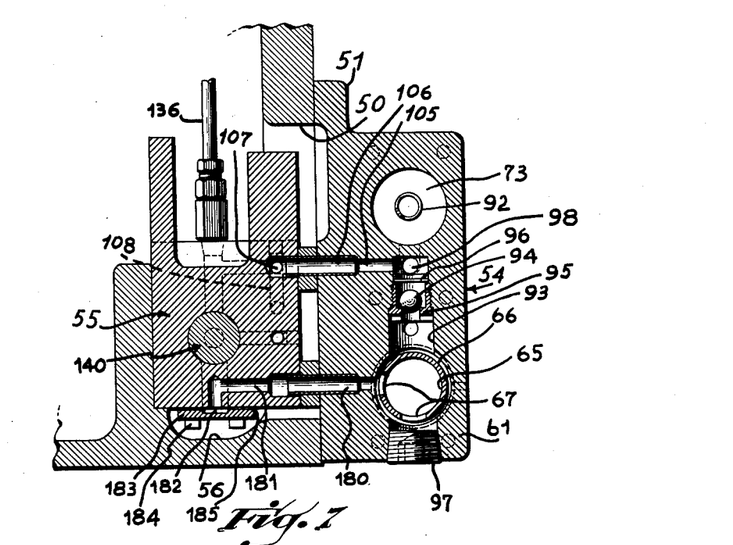
Figure 7 is a sectional view somewhat similar to Figure 6, further detailing the relationship between the two pump units and the lubricant passageways interconnecting the two units.
Figures 9, 10:
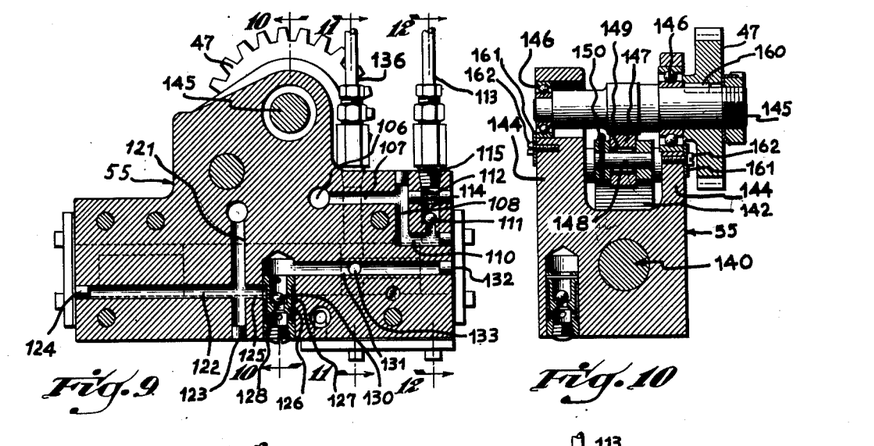
Figure 9 is a sectional view somewhat similar to Figure 8 taken on line 9—9, Figure 6, further detailing the lubricant passageways formed in the housing of the power operated pump unit.
Figure 10 is a sectional view taken on line 10—10, Figure 9, detailing the cam shaft, driving gear and cam follower of the power operated pump.
Figure 12:
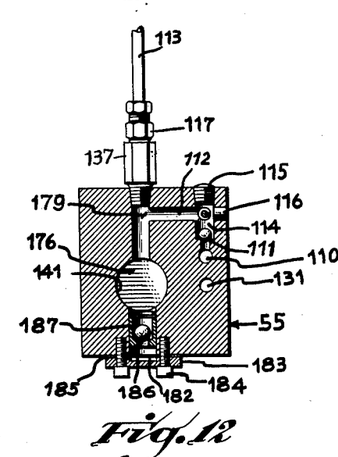
Figure 12 is a sectional view similar to Figure 11, illustrating the oil passageways leading from the pumps to the carriage lubricant supply conduit.

When actuating lever 46 is moved downwardly, the piston 74 moves to the right as viewed in Figure 5, forcing oil from the large volume displacement chamber 73 through branch passageway 98 into a lateral passageway 105. As shown in Figure 7, the lubricant passes through passageway 105, through nipple 106 to a branch passageway 107 formed in the automatic pump casing 55. As shown in Figures 7, 9 and 12, oil, discharging from nipple 106, passes through passageway 107 to a vertical passageway 108, horizontal passageway 110, past ball check valve 111 to a horizontal passageway 112 which communicates with the carriage lubricant conduit 113 by way of a passageway 179. The passageway 114, which forms the seat for ball check valve 111, is blocked at its upper end by means of a plug 115, and horizontal passageway 112 is blocked by plug 116. The conduit 113 is connected to the housing 55 by means of a tube coupling 117 of conventional design.

Figure 8:
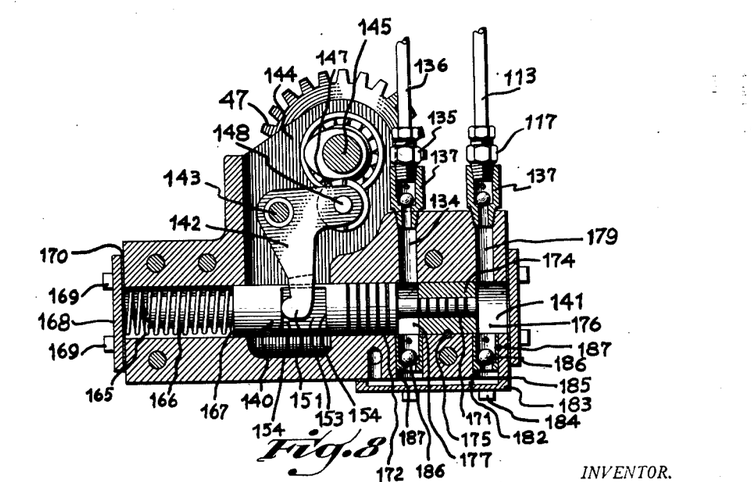
Figure 8 is a sectional view taken on line 8—8, Figure 6, detailing the automatic power operated pump structure and the driving apparatus for the plunger of the pump.
Figure 11:
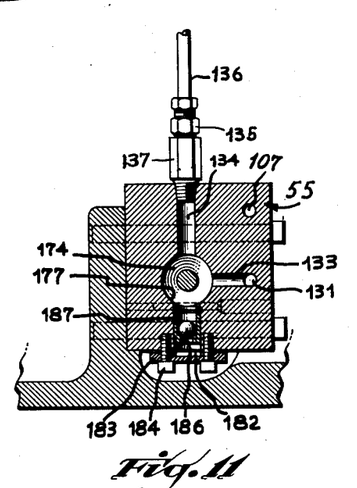
Figure 11 is a sectional view taken on line 11—11, Figure 9, illustrating the lubricant passageways leading from the hand and power operated pumps to the apron lubricant conduit.

The low volume oil delivery from displacement chamber 84 is carried by vertical passageway 101 (Figure 5) and is blocked by ball check valve 102. Branch passageway 118 extends laterally from passageway 101 and conveys the lubricant to a nipple 120 which extends to the automatic pump housing 55. The nipple 120 (Figure 6) communicates with a vertical passageway 121 to a horizontal branch passageway 122, the lower end of passageway 121 being plugged as at 123. As shown in Figure 9, branch passageway 122 has its outer end plugged as at 124 and its inner end communicates with a bore 125 to the outside diameter of a valve cage 126. An annular groove 127 is provided around cage 126 so that the lubricant passes from the annular groove through radial openings 128, past ball check valve 130 to a horizontal passageway 131. The outer end of passageway 131 is plugged as at 132. The lubricant passes from passageway 131 to branch passageway 133 (Figure 11) through the high volume delivery chamber of the automatic pump as shown in Figure 8, thence upwardly through passageway 134 to a fitting 135 similar to the fitting previously described with reference to the carriage supply conduit 113 to the apron lubricant supply conduit 136. As shown in Figure 8, check valves 137—137 are inserted between the respective delivery passageways and the conduits 113 and 136 to prevent back flow of fluid from the respective conduits.

From the foregoing it will be observed that a large volume of lubricant is discharged from displacement chamber 73 to the carriage conduit and a relatively low volume of oil is discharged by displacement chamber 84 to the apron conduit when lever 46 is depressed. It will further be noted that the high volume supply to the carriage communicates with the low volume supply displacement chamber of the automatic pump, while the low volume supply from the auxiliary pump communicates with the high volume displacement chamber of the automatic pump to the apron conduit. Thus, when the auxiliary pump is manually operated, a high volume of oil is discharged to the carriage lubricating conduit and a low volume to the apron lubricating conduit, while on the other hand, when the automatic pump operates, a low volume is discharged to the carriage and a high volume to the apron.

Automatic pump structure

As shown in Figure 8, the automatic lubricant delivery plunger is indicated generally at 140. The plunger 140 is slidably sustained in a bore 141 formed in the pump housing 55. Plunger 140 is reciprocated by means of a bell crank lever 142 pivotally mounted as at 143 between a pair of vertical brackets 144 formed as an integral part of the housing 55. A cam shaft 145 is carried by ball bearings 146 seated in bores formed in the respective brackets 144 (Figure 10). Bell crank lever 142 includes a cam roller 147 journalled on cross pin 148, preferably upon a needle bearing 149. The end of the bell crank lever carrying the cam roller preferably is bifurcated as shown in Figure 10, and one end of pin 148 is secured to the bell crank lever by means of a cotter pin 150. It will be apparent that rotation of the cam shaft 145 will cause the low end 151 of the bell crank to swing toward the left as viewed in Figure 8. The swinging end 151 of the bell crank lever is bifurcated as at 152 and the pump plunger 140 has its opposite sides milled out as at 153 (Figure 6) to provide shoulders 154—154 for engagement with the actuating end of the bell crank lever. The pivot pin 143 for the bell crank lever preferably includes needle bearings 155 as shown in Figure 6, one end of the pin 143 having a head 156 engaged in a bore formed in the bracket. The opposite end of the pivot pin is secured and carried by a bushing 157 which is locked in place by a set screw 158 to permit assembly and to maintain the needle bearings in position.

As shown in Figure 10, the pump actuating pinion 47 is keyed as at 160 to the cam shaft 145. The cam shaft is carried by means of previously noted ball bearings 146—146 at opposite ends, the bearings being locked in position by means of plates 161 secured by screws 162. It will be apparent that rotation of pinion 47, by operation of gear 34, will cause reciprocation of the bell crank lever and pump plunger.

Pump plunger 140 is spring loaded by means of a compression spring 165 which is disposed within the bore 141 at the left end of the bore as viewed in Figure 8. Plunger 140 includes a stud 166 to guide the spring axially and one end of the spring is seated against the shoulder 167 of the plunger, while the opposite end is seated against a closure plate 168 secured by means of screws 169 to the pump casing. Gasket 170 is interposed between plate 168 and the pump housing to prevent leakage of oil from the bore 141. It will be noted that the spring 165 thrusts plunger 140 toward the right as viewed in Figure 8, so that the pumping force is developed by the spring while the return stroke of the plunger is developed by the bell crank lever 142. Thus, should excessive back pressure develop in the distribution system, the plunger will stall and damage to the apparatus will be avoided.

Figure 13:
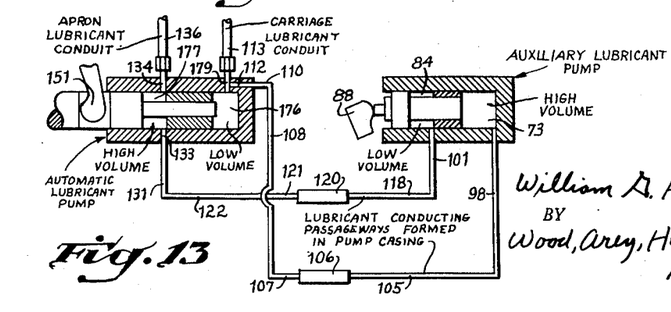
Figure 13 is a simplified diagram illustrating generally the arrangement of oil passageways leading from the power operated automatic pump and from the hand operated pump to the main delivery conduits for conducting lubricant to the apron and carriage respectively.

The right end of plunger 140 is counterturned to provide a high pressure piston 171 and a low pressure piston 172. Both pistons include oil seal grooves as previously described with reference to the hand pump. Piston 171 is slidably disposed in a bushing 174 secured by means of a screw 175 in the bore 141. The right end of bore 141, as viewed in Figure 8, thus forms a high pressure, low volume displacement chamber 176 while the bore to the opposite side of bushing 174 forms a low pressure, high volume displacement chamber 177. The previously described vertical passageway 134 communicates with the low pressure displacement chamber 177 to discharge the lubricant to the apron lubricant conduit 136. The high pressure, low volume displacement chamber 176 communicates with the passageway 179 to the carriage lubricating conduit 113. As previously noted, the passageways 134 and 179 also communicate with the high and low volume displacement chambers of the hand operated auxiliary pump in reverse order so that the low volume displacement chamber 84 of the auxiliary pump communicates with passageway 134 and with the high volume displacement chamber 177 of the automatic pump. Thus, when the auxiliary hand pump is operated, high volume discharge occurs through passageway 179 and low volume displacement through passageway 134 and when the automatic pump operates, the distribution of oil is reversed. That is, when the automatic pump is operating the high volume discharge occurs through passageway 134 and low volume discharge occurs through passageway 179. The reversal of oil flow is most clearly disclosed in Figure 13 which diagrams in a simplified manner the passageways from the two pumps to the carriage and apron conduits.

As shown in Figure 7, lubricant is supplied to the automatic pump from the inside diameter of bushing 85, lateral passageway 87, annular groove 86, a nipple 180 to a passageway 181 of pump housing 155. Passageway 181 communicates with the slot 182 of a manifold plate 183 (Figure 8) secured by screws 184 to the bottom of pump casing 55. A gasket 185 is interposed between manifold plate 183 and the pump housing. A pair of ball check valves 186—186 confined in cages 187 are interposed between the manifold slot 182 and the respective high and low volume displacement chambers 176 and 177.

As cam shaft 145 rotates, the cam 147 swings the lower end 151 of bell crank lever 152 to the right causing lubricant to be drawn through the check valves 186—186 into the high and low volume displacement chambers 176 and 177. As the high point of the cam passes roller 147, compression spring 165 forces the plunger to the right causing discharge of oil from the respective displacement chambers under spring pressure. Thus, the compression spring prevents lost motion in the pump actuating parts and the pressure of the lubricant discharge is controlled by the spring. In other words, should the lubricant distribution system become clogged, the spring will permit the plunger to remain stationary by reason of back pressure.

Oil distribution system

As disclosed in Figures 1, 2 and 3, the apron lubricant conduit 136 extends upwardly from the pump and communicates with a bore open at the top of the apron. As shown in Figure 3, the lubricant is supplied to the grooves 190—190 from the discharge end of conduit 136, to a vertical passageway 192 formed in the saddle 20. A cross passageway 193 communicates with passageway 192 and vertical branch passageways 194—194 connect with passageway 193 and lead to the grooves 190—190. From grooves 190—190 the lubricant is fed downwardly through passageways 191 drilled in the apron walls to the various bearings.

The carriage lubricant conduit 113 likewise opens to the top of the apron, see Figure 2, and a vertical passageway 195 (Figure 3) registers with the discharge opening and communicates with a cross passageway 196. A series of vertical branch passageways 197 extend between cross passageway 196 to the ways 17—18 of the lathe bed and upwardly to the tool slide ways 26 to lubricate the saddle and tool slide respectively. The oil distribution system follows substantially that disclosed in the above noted co-pending application and for this reason, it is not deemed necessary to further elaborate on this structure.

By virtue of the present apparatus, the operator is able to actuate the auxiliary pump to place a film of oil on the bed ways either prior to starting the machine, or at any other time that he believes additional lubrication to be necessary. By reason of the interconnection between the hand and power pumps, the apparatus is of ultimate simplicity and efficiency. By leading the lubricant supply from the manual pump to the automatic pump in alternate directions, the proper amount of lubricant is supplied automatically so that sufficient lubricant is supplied to the ways for starting and a low volume of lubricant is supplied during automatic operation to prevent flooding. As above noted, the high volume automatic discharge to the apron is immaterial since excess oil drains immediately back to the reservoir in the apron. By assembling both the automatic and hand operated pumps together and mounting the unit to the outside of the apron, the complete assembly may conveniently be removed for service or repair when desired.

Having described my invention, I claim:

1. An apparatus for lubricating the bed ways and apron gearing of a lathe comprising; a manually operable lubricant supply pump, a hand lever connected to the manually operable pump for reciprocating the same, an automatic lubricant supply pump associated with said manually operated pump, driving means connecting the automatic pump to the apron gearing for reciprocating the same, a high volume and a low volume displacement piston and chamber in each of said respective pumps, a lubricant supply reservoir associated with both of said pumps, a lubricant distribution system leading from the respective high volume and low volume displacement chambers of said manually operated pump and automatic pump to said carriage and apron gearing respectively, the respective high volume and low volume displacement chambers of each of said pumps communicating with each other in reverse order whereby operation of either of said pumps supplies lubricant to the carriage and apron gearing concurrently at high and low volume displacement, the high and low volume displacement being supplied in reverse order to the carriage and apron gearing upon operation respectively of the manually operated pump and automatic pump.

2. An apparatus for lubricating the carriage and apron gearing of a lathe comprising; a manually operable lubricant supply pump, a hand lever connected to the manually operable pump for reciprocating the same, an automatic lubricant supply pump associated with said manually operated pump, a high volume and a low volume displacement piston and chamber in each of said respective pumps, a lubricant supply system associated with said pumps, a lubricant distribution system leading from the respective high volume and low volume displacement chambers of said manually operated pump and automatic pump to said carriage and apron gearing respectively, driving means between the apron gearing and said automatic pump to operate the same when the carriage is translated, the high volume and low volume displacement chambers of said automatic pump communicating in reverse order with the high and low volume chambers of said manually operated pump whereby operation of either of said pumps delivers lubricant to the carriage and apron gearing concurrently at high and low volume displacement, the high and low volume displacement being supplied in reverse order to the carriage and apron gearing upon operation respectively of the manually operated pump and automatic pump.

3. In a combined manual and automatic lubrication supply pump for a lathe or the like, a manually operated pump, an automatic power operated pump associated with said manually operated pump, a respective plunger slidably sustained in each of said pumps, each of said plungers having a high and a low displacement piston, automatic means in connection with said automatic pump for reciprocating the plunger, a lubricant supply reservoir communicating with said pumps, respective passageways cross connecting said respective high and low displacement pistons and respective delivery arteries communicating with said respective passageways.

4. In a combined manual and automatic lubrication supply pump for the carriage and apron gear train of a lathe, a manually operated pump casing, a positive displacement hand operated plunger slidably disposed in said casing, said hand operated plunger having a high and low displacement piston, a hand lever connected to said hand operated plunger for reciprocating the same, an automatic power operated pump casing secured to said manually operated pump casing, a power operated plunger slidably disposed in said casing, said power operated plunger having a high and low displacement piston, automatic power means in connection with said power operated plunger for reciprocating the same when the lathe is operated, a lubricant distribution system arranged to supply lubricant to the carriage and gear train of the apron respectively from said high and low displacement pistons, the displacement pistons of said manually operated pump being arranged to supply the high volume of lubricant to the carriage and the low volume to the apron gearing, and the displacement piston of said power operated pump plunger being arranged to supply the low volume of lubricant to the carriage and the high volume to the apron gearing when the lathe is in operation.

5. A lubricant supply pump for a lathe or the like comprising; a hand operated pump having a high and low volume displacement plunger, a hand lever connected to said hand operated pump plunger for reciprocating the same in discharging direction and including a spring for reciprocating the same in charging direction, a power operated pump associated with said hand operated pump and having a high and low volume displacement plunger, driving means in connection with said power operated pump plunger arranged to reciprocate the same in charging direction when the lathe is placed in operation, and including a spring for driving said power operated pump plunger in discharging direction, a lubricant supply system communicating in common with said plungers and respective lubricant distributing systems extending from the high and low volume displacement plungers of each of said pumps to the components of the lathe, whereby said manually operated pump may be actuated to supply lubricant at high and low volume displacement to the components of the lathe under positive discharge by operation of said hand lever prior to placing the same in operation and said power operated pump supplies lubricant at high and low volume displacement to the components of the lathe automatically under spring pressure during lathe operation.

6. In a lathe having bed ways, a carriage slidably sustained on said ways, an apron, and apron gearing, a lubricant supply pump for discharging lubricant to said carriage and apron gearing respectively comprising; a manually operated pump casing secured to said apron, a lubricant rerservoir in communication with said manually actuated pump casing, a manually operated pump plunger slidably mounted in said casing, the manually operated pump plunger being in communication with the apron gearing and carriage respectively and adapted to advance lubricant from the reservoir to the carriage and apron gearing, an actuating lever in operative connection with said manually operated pump plunger, an automatic pump casing associated with said manual pump casing, the automatic pump casing being in communication with said lubricant reservoir, a power operated discharge plunger slidably mounted in said automatic pump casing, said power operated plunger having respective high and low displacement pistons in communication with the apron gearing and carriage respectively and adapted to advance lubricant from the reservoir to the carriage and apron gearing, driving means in connection with said power operated plunger for actuating the same when the carriage is translated, a spring associated with said power operated plunger and adapted to actuate the same during its discharge stroke, whereby said manually actuated pump plunger provides positive lubricant displacement and said power operated pump plunger is urged in discharge direction by spring pressure adapting the same to stall when the back pressure becomes excessive.

7. In a lathe having bed ways, a carriage slidably sustained on said ways, an apron, and apron gearing, a lubricant supply pump for discharging lubricant to said carriage and apron gearing respectively comprising; a manually operated pump casing secured to said apron, a lubricant reservoir in communication with said pump casing, a manually actuated pump plunger slidably mounted in said casing, an actuating lever in operative connection with said manually actuated plunger, said manually actuated plunger having respective high and low volume displacement pistons in communication with said carriage and apron gearing respectively, and adapted to advance lubricant from the reservoir to the carriage and apron gearing, a spring disposed in operating connection with the manually actuated plunger to return the same to charging position after a manual discharge stroke, an automatic pump casing associated with said manually operated pump casing, the automatic pump casing being in communication with the lubricant reservoir, a power operated discharge plunger slidably mounted in said automatic pump casing, driving means in connection with said power operated plunger for actuating the same during its charging stroke when the carriage is translated, the power operated plunger being in communication with the carriage and apron gearing respectively and adapted to advance lubricant from the reservoir to the carriage and apron, a spring associated with said power operated plunger and adapted to actuate the same during its discharge stroke, whereby said manually actuated pump plunger provides positive lubricant displacement and said power operated pump plunger is urged by spring pressure in its delivery stroke adapting the same to stall when the back pressure becomes excessive.

8. A lubricant supply pump for attachment to the apron of a lathe carriage to supply lubricant to the carriage and apron gearing comprising; a manually operated pump secured to the outside of said apron, an automatically operated pump secured to said manually operated pump and extending to the interior of said apron, a lubricant reservoir in said apron communicating with both of said pumps, a driving gear train within said apron for translating the carriage relative to the bed of the lathe, a pinion on said automatically operated pump meshing with said gear train, a lever on said manually operated pump for actuating the same, lubricant delivery passageways extending from said pumps respectively to said carriage and apron gearing, said automatic pump operable through said gear train to deliver lubricant when said carriage is translated and said manually operated pump being arranged for operation independent of said automatic pump for lubrication of the carriage and ways prior to translation of the carriage.

9. A lubricant supply pump for attachment to the apron of a lathe carriage for lubricating the carriage and apron gearing comprising; a manually operated lubricant supply pump, a flange on said pump for attachment to the apron, said apron having an opening to receive said pump and having a lubricant reservoir internally thereof, an automatic lubricant supply pump secured to said manually operated pump and disposed within said apron, passageways in said manually operated pump communicating with said reservoir, passageways interconnecting said reservoir, passageways interconnecting said manually operable pump with said automatic pump to supply lubricant to both of said pumps from said reservoir, a lubricant distribution system leading from said respective pumps to the carriage and apron gearing, a manually operated lever in driving connection with said manually operated pump and driving means within said apron operable to energize said automatic pump when said apron is translated.

WILLIAM G. HOELSCHER.

References Cited in the file of this patent

UNITED STATES PATENTS

| Number | Name | Date |
| --- | --- | --- |
| 649,027 | Woodward | May 8, 1900 |
| 1,410,125 | Rhoads | Mar. 21, 1922 |
| 1,570,668 | Griffith | Jan. 26, 1926 |
| 1,607,855 | Winkley | Nov. 23, 1926 |
| 1,653,538 | Barrett | Dec. 20, 1927 |
| 1,660,899 | Tillery | Feb. 28, 1928 |
| 1,773,312 | Leufstadius | Aug. 19, 1930 |
| 1,781,755 | Groene | Nov. 18, 1930 |
| 2,190,581 | Wineman | Feb. 13, 1940 |
| 2,229,085 | Kocher | Jan. 21, 1941 |
| 2,290,810 | Murad | July 21, 1942 |
| 2,343,302 | Kocher | Mar. 7, 1944 |

FOREIGN PATENTS

| Number | Country | Date |
| --- | --- | --- |
| 328,809 | Great Britain | May 8, 1930 |